(12) United States Patent
Bauch

(10) Patent No.: US 6,818,711 B2
(45) Date of Patent: Nov. 16, 2004

(54) POLYMERIZATION OF OLEFINS USING A ZIEGLER-NATTA CATALYST SYSTEM HAVING AN EXTERNAL ELECTRON DONOR

(75) Inventor: Christopher G. Bauch, Prairieville, LA (US)

(73) Assignee: Fina Technology, Inc., Houston, TX (US)

( * ) Notice: Subject to any disclaimer, the term of this patent is extended or adjusted under 35 U.S.C. 154(b) by 36 days.

(21) Appl. No.: 10/335,751

(22) Filed: Jan. 1, 2003

(65) Prior Publication Data

US 2004/0127656 A1 Jul. 1, 2004

(51) Int. Cl.$^7$ ................................................ C08F 4/44
(52) U.S. Cl. ................. 526/142; 526/124.3; 526/124.1; 526/348; 502/103; 502/126
(58) Field of Search ........................... 526/124.3, 124.1, 526/348, 142; 502/103, 126

(56) References Cited

U.S. PATENT DOCUMENTS

| 4,107,413 | A | 8/1978 | Giannini et al. |
| 4,114,319 | A | 9/1978 | Governale |
| 4,220,654 | A | 9/1980 | Bolhofer et al. |
| 4,294,721 | A | 10/1981 | Cecchin et al. |
| 4,439,540 | A | 3/1984 | Cecchin et al. |
| 4,460,701 | A | 7/1984 | Terano et al. |
| 4,562,713 | A | 1/1986 | Kondoh |
| 4,816,433 | A | 3/1989 | Terano et al. |
| 4,839,321 | A | 6/1989 | Murai et al. |
| 4,927,797 | A | 5/1990 | Ewen |
| 5,066,738 | A | 11/1991 | Ewen |

FOREIGN PATENT DOCUMENTS

EP 0 657 473 A2 * 6/1995

* cited by examiner

Primary Examiner—Ling-Siu Choi
(74) Attorney, Agent, or Firm—Madan, Mossman & Sriram, P.C.

(57) ABSTRACT

A process for polymerizing olefins using a catalyst system comprising a conventional Ziegler-Natta catalyst and an external election donor selected from the group consisting of diethers and combinations thereof. The catalyst system comprises a Ziegler-Natta catalyst having a transition metal compound generally represented by the formula: $MR'_x$ where M is a transition metal, R' is a halogen or a hydrocarboxyl, and x is the valence of the transition metal. The transition metal compound can be $TiCl_4$. The Ziegler-Natta catalyst may comprise an internal electron donor, such as phthalate. The catalyst system further includes an external electron donor selected from the group consisting of diethers and a co-catalyst selected from the group of organoaluminum compounds. In one embodiment, the external electron donor is 2,2-diisobutyl-1,3-dimethoxypropane, and the co-catalyst is triethylaluminum. During polymerization, the catalyst system is introduced to a reaction zone along with one or more olefin monomers under suitable polymerization conditions.

19 Claims, No Drawings

POLYMERIZATION OF OLEFINS USING A ZIEGLER-NATTA CATALYST SYSTEM HAVING AN EXTERNAL ELECTRON DONOR

FIELD OF THE INVENTION

This invention generally relates to using a catalyst system for the polymerization of olefins. More specifically, the invention relates to the polymerization of olefins using a catalyst system comprising a Ziegler-Natta catalyst and a diether-based external donor.

BACKGROUND OF THE INVENTION

Olefins, also called alkenes, are unsaturated hydrocarbons whose molecules contain one or more pairs of carbon atoms linked together by a double bond. When subjected to a polymerization process, olefins are converted to polyolefins, such as polyethylene and polypropylene. One commonly used polymerization process involves contacting the olefin monomer with a Ziegler-Natta catalyst system that includes a conventional Ziegler-Natta catalyst, a co-catalyst, and one or more electron donors. Examples of such catalyst systems are provided in U.S. Pat. Nos. 4,107,413; 4,294,721; 4,439,540; 4,114,319; 4,220,554; 4,460,701; 4,562,173; and 5,066,738, which are incorporated by reference herein.

Conventional Ziegler-Natta catalysts comprise a transition metal compound, e.g., titanium tetrachloride ($TiCl_4$), supported on an inert solid, such as a magnesium compound. An internal electron donor is typically added to the Ziegler-Natta catalyst during its preparation and can be combined with the support or otherwise complexed with the transition metal compound. Examples of internal electron donors include amines, amides, esters, ketones, nitriles, and phosphines. The internal electron donor is used to reduce the atactic form of the resulting polymer, thus decreasing the amount of xylene solubles. A polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

During the polymerization process, an external electron donor may be added to the catalyst to further control the amount of atactic polymer produced. Examples of commonly used external electron donors include organosilicon compounds, such as diphenyldimethoxysilane (DPMS), cyclohexylmethyl dimethoxysilane (CMDS), and dicyclopentyl dimethoxysilane (CPDS). A co-catalyst, such as an organoaluminum compound, also may be used in conjunction with the Ziegler-Natta catalyst to activate the catalyst by initiating the polymer chain.

In the polymerization process, hydrogen can be fed to the catalyst system to terminate the chain formation of the polymer, thereby altering the molecular weight and the melt flow rate of the polymer. The hydrogen response of the Ziegler-Natta catalyst affects the molecular weight of the polymer produced. In particular, an increase in hydrogen response produces a lower molecular weight polymer (i.e., shorter chain length), and a decrease in hydrogen response produces a higher molecular weight polymer (i.e., longer chain length). As molecular weight decreases, the melt flow rate (MFR) of the polymer increases. Polyolefins having relatively high MFR values are desirable because they offer numerous processing advantages. For example, lower temperatures and pressures are required for the extrusion of such polyolefins. Further, the use of such polyolefins reduces the wear on the extrusion equipment. Also, high MFR values are useful in high throughput (i.e., fast rates) molding applications as the resin flows more easily.

The present invention provides an improved catalyst system having an external electron donor that is particularly compatible with conventional Ziegler-Natta catalysts. The addition of this external electron donor forms a catalyst system that is more responsive to hydrogen. As such, lower molecular weight polyolefins with higher MFR values may be formed from the catalyst system.

SUMMARY OF THE INVENTION

The present invention includes a catalyst system for the polymerization of olefins comprising a conventional Ziegler-Natta catalyst and an external election donor selected from the group consisting of diethers and combinations thereof. The catalyst system comprises a Ziegler-Natta catalyst having a transition metal compound generally represented by the formula:

$$MR'_x$$ 

where M is a transition metal, R' is a halogen or a hydrocarboxyl, and x is the valence of the transition metal. The transition metal compound can be $TiCl_4$. The Ziegler-Natta catalyst may also comprise an internal electron donor, such as phthalate. The catalyst system further includes an external electron donor selected from the group consisting of diethers and a co-catalyst selected from the group of organoaluminum compounds. In one embodiment, the external electron donor is 2,2-diisobutyl-1,3-dimethoxypropane, and the co-catalyst is triethylaluminum.

The present invention further includes a process for polymerizing olefins that includes introducing a catalyst system comprising a Ziegler-Natta catalyst and an external election donor selected from the group consisting of diethers and combinations thereof into a reaction zone, and feeding one or more olefin monomers to the reaction zone under conditions suitable for polymerization. The Ziegler-Natta catalyst can comprise a transition metal compound, e.g., $TiCl_4$, and an internal electron donor, e.g., phthalate. The external election donor can comprise 2,2-diisobutyl-1,3-dimethoxypropane. The catalyst system may further comprise an organoaluminum compound acting as a co-catalyst. The polymerization process can also include extracting polyolefin polymers. The polymerization process can produce polyolefins having a relatively high hydrogen response and containing a relatively low level of xylene solubles, such as for example less than 3 wt %.

DETAILED DESCRIPTION OF THE PREFERRED EMBODIMENTS

According to an embodiment of the present invention, a catalyst system is formed that includes a conventional Ziegler-Natta catalyst and an external electron donor. Conventional Ziegler-Natta catalysts comprise a transition metal compound generally represented by the formula:

$$MR'_x$$ 

where M is a transition metal, R' is a halogen or a hydrocarboxyl, and x is the valence of the transition metal. M can be a group IVB metal, such as titanium, chromium, or vanadium, and most preferably titanium. R' can be chlorine, bromine, or an alkoxy, and can be an ethoxy. Transition metal compounds can be, for example, $TiCl_4$, TiBr$_4$, Ti(OC$_2$H$_5$)$_3$Cl, Ti(OC$_3$H$_7$)$_2$Cl$_2$, Ti(OC$_6$H$_{13}$)$_2$Cl$_2$, Ti(OC$_2$H$_5$)$_2$Br$_2$, Ti(OC$_{12}$H$_{25}$)Cl$_3$, and combinations thereof. No restriction on the number of transition metal compounds is made so long as at least one transition metal compound is present.

The transition metal compound is typically supported on an inert solid, e.g., a metal hydride and/or metal alkyl, typically a magnesium compound such as magnesium halides, dialkoxymagnesiums, alkoxymagnesium halides, magnesium oxyhalides, dialkylmagnesiums, magnesium oxide, magnesium hydroxide, magnesium carboxylates, and can be magnesium dichloride or magnesium dibromide. Typical magnesium levels range from about 12% to about 20% by weight of catalyst. Silica may alternatively be used as a support.

The Ziegler-Natta catalyst may further comprise any internal electron donor compatible with the catalyst. The internal electron donor is combined with the transition metal compound or the support during the preparation of the Ziegler-Natta catalyst. The internal electron donor can be selected from the group consisting of an aromatic ester, phthalate, and mixtures thereof. An example of a suitable Ziegler-Natta catalyst containing phthalate as the internal donor is commercially available from Toho Titanium, Inc. under the tradename THC-A021. This type of catalyst may be prepared in accordance with the materials and processes disclosed in U.S. Pat. Nos. 4,927,797; 4,816,433; and 4,839,321, each of which is incorporated herein by reference in its entirety. Another particularly suitable catalyst is commercially available from Catalyst Resources, Inc. of Bayport, Tex. under the tradename Lynx 1000. This type of catalyst may be prepared in accordance with the materials and processes disclosed in U.S. Pat. Nos. 4,861,847 and 4,784,983, each of which is incorporated herein by reference in its entirety.

As stated previously, the catalyst system of the present invention also includes an external electron donor selected from the group consisting of diethers and combinations thereof. The external electron donor can be selected from the group consisting of 1,3-diethers generally represented by the formula:

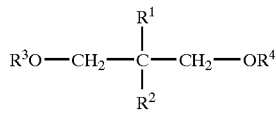

where R$^1$ is an alkyl, cycloalkyl, or aryl group, R$^2$ is an alkyl, cycloalkyl, or aryl group, R$^3$ is an alkyl, cycloalkyl, or aryl group, and R$^4$ is an alkyl, cycloalkyl, or aryl group, wherein any one or more of R$^1$, R$^2$, R$^3$, R$^4$ may be the same or different. The external donor can be an ether selected from the group consisting of 2,2-diisobutyl-1,3-dimethoxypropane, 2-isopropyl-2-isopentyl-1,3-dimethoxypropane, 2,2-bis(cyclohexylmethyl)-1,3-dimethoxypropane, and 2,2-bis(cyclohexylmethyl)-1,3-dimethoxypropane. The external electron donor can be 2,2-diisobutyl-1,3-dimethoxypropane (DIBDP). Without in any way limiting the scope of the invention, it is believed that the external electron donor acts as a stereoselective control agent to control the amount of atactic or non-stereoregular polymer produced during polymerization. In particular, the electron donor fills an electrophilic site on one side of a growing polymer chain that would otherwise be filled by an olefin monomer. It is believed that the atoms of the polymer chain then rearrange in such a way that another electrophilic site becomes available on the other side of the polymer chain. This new electrophilic site is filled by the next monomer added to the chain, thereby driving the chain toward its isotactic form. In this manner, the external electron donor reduces the amount of the atactic form of polymer produced, thus reducing the amount of xylene solubles present in the polymer. Isotactic polyolefins are generally believed to have more desirable mechanical properties than atactic polyolefins.

The catalyst system may also include a co-catalyst that is used in conjunction with the Zeigler-Natta catalyst and the external electron donor. The co-catalyst can be an organoaluminum compound such as trialkylaluminum, alkylaluminum dihalide, trialkoxyaluminum, dialkylaluminum halide, triisobutylaluminum, and combinations thereof, and can be triethylaluminum (TEAL). It is recognized that the catalyst system may contain other components deemed appropriate by one skilled in the art.

In another embodiment of the present invention, a process for polymerizing olefins includes (a) introducing a catalyst system comprising a Ziegler-Natta catalyst and an external election donor selected from the group consisting of diethers and combinations thereof into a reaction zone, and (b) feeding an olefin monomer to the reaction zone under conditions suitable for polymerization. The catalyst system may also include a suitable co-catalyst. The compositions of the Ziegler-Natta catalyst, the external electron donor, and the co-catalyst used for the polymerization process can be the same as those described above in reference to the catalyst system of the present invention. The olefin monomer fed to the reaction zone may be, for example, ethylene, propylene, and combinations thereof to produce homopolymers or copolymers.

Reaction conditions, such as temperature, pressure, and reaction time, suitable for the polymerization of olefins may be employed for this process. The reaction conditions can be selected to alter the physical properties (e.g., molecular weight) of the polyolefins. The polymerization process may be performed either batchwise or continuously. Other process conditions and equipment, such as the type of reactors that may be used, would generally be known to one skilled in the art.

A polyolefin, such as polypropylene, produced by the polymerization process of the present invention may exhibit several desirable characteristics. First, the polyolefin may show increased response to hydrogen such that the polymer chain formation can be terminated when the chain is relatively short. Therefore, lower hydrogen levels may be required to form a relatively low molecular weight polyolefin having a relatively high MFR value. Using lower hydrogen levels advantageously allows the process to be operated within certain process limitations, for example, within the hydrogen solubility limits of liquid full processes such as a loop process. Exceeding the hydrogen solubility in such a process can cause gas pockets or bubbles to form in the reactor which may disrupt reactor circulation, this solubility limit is sometimes referred to as the bubble point limit. Further, the polyolefin may possesse a relatively low level of xylene solubles, such as for example those shown in Table 1. Moreover, the polyolefin may experience a reduced incidence of chain scission, degradation, or shortening due to exposure to free-radicals such as peroxides. Such exposure to free-radicals may not be necessary because the catalyst system of the present invention includes a diether, e.g., DIBDP, that acts as an external electron donor.

EXAMPLES

The invention having been generally described, the following examples are given as particular embodiments of the invention. It is understood that the examples are given by way of illustration and are not intended to limit the specification or the claims to follow in any manner.

Nineteen polymerization tests were performed using an autoclave type reactor having a capacity of two liters. Some tests were run using the catalyst system of the present invention, which comprises DIBDP as the external electron donor. Other control tests were run using a conventional catalyst system comprising cyclohexylmethyl dimethoxysilane (CMDS) as the external electron donor, thus allowing the two types of catalyst systems to be compared. Two Ziegler-Natta catalysts, THC-A021 available from Toho Catalyst Ltd. and Lynx 1000 available from Engelhard Corp., were used in different test runs.

Example 1

Prior to the polymerization test run, all traces of moisture and air were expelled from the reactor by heating it to a temperature over 100° C. for a minimum of 30 minutes under a constant purge of dry nitrogen. Following this heating, the reactor was cooled to room temperature (25° C.) while being purged with nitrogen. The reactor was stabilized at room temperature and then 16 mmoles of hydrogen (Hz) and 1.45 L of propylene were added to the reactor. The reactor was stirred at 1300 rpm. Next, 1.0 mmole of TEAL and 0.1 mmole of DIBDP were added to a tubular reaction vessel having a 40 cc capacity. The TEAL and the DIBDP were allowed to pre-contact for approximately one minute. Ten milligrams of THC-32A catalyst in a mineral oil suspension were then added to tubular reactor vessel. The catalyst was allowed to pre-contact the TEAL and DIBDP mixture for approximately two minutes. The tubular reaction vessel was subsequently attached to an entry point on the reactor, and the contents of the vessel were flushed into the reactor along with 1.45 L of room temperature propylene. The total amount of liquid propylene present in the reactor was about 2.9 L. The reactor temperature was then raised to 70° C. The polymerization reaction was allowed to proceed for one hour, at which point was terminated by venting the excess propylene and cooling the reactor to room temperature. The reactor was then opened to collect the polymer product, which was later dried, weighed, and analyzed.

The following is a summary of the polymerization conditions used in Example 1:

| | |
|---|---|
| Amount of ZN catalyst: | 10.0 mg |
| Amount of TEAL (co-catalyst) | 1.0 mmole |
| Amount of DIBDP (donor) | 0.1 mmole |
| Al/Donor | 10 |
| Amount of Propylene: | 2.9 L (1,500 g) |
| Temperature: | 70° C. |
| Reaction Time: | 60 minutes |

The aluminum (Al)/donor ratio (Al/D) was calculated from the molar amount of Al in the co-catalyst present divided by the molar amount of external electron donor present. The xylene solubles in the resulting polymer were measured by dissolving the polymer in hot xylene, cooling the solution to 0° C., and precipitating out the isotactic form of the polymer. The xylene solubles (XS) were then determined to be the weight % of the polymer that was soluble in the cold xylene. The MFR of the weight in grams of the polymer melt extruded for 10 minutes at 230° C. was determined according to ASTM D1238-90b, entitled "Standard Test Method for Melt Flow Rates of Thermoplastics by Extrusion Plastometer." In addition, the bulk density (BD) of the polymer and the catalyst activity, i.e., the amount of polymer produced per gram of catalyst, were determined.

Example 2

The procedure of Example 1 was followed except that 48 mmols of $H_2$ were added to the reactor.

Example 3

The procedure of Example 1 was followed except that the Al/donor (Al/D) ratio was changed to 50.

Example 4

The procedure of Example 1 was followed except that 48 mmols of $H_2$ were added to the reactor and the Al/donor ratio was changed to 50.

Example 5

The procedure of Example 1 was followed except that DIBDP was replaced with CMDS as the external electron donor.

Example 6

The procedure of Example 1 was followed except that DIBDP was replaced with CMDS as the external electron donor and 32 mmols of $H_2$ were added to the reactor.

Example 7

The procedure of Example 1 was followed except that DIBDP was replaced with CMDS as the external electron donor and 48 mmols of $H_2$ were added to the reactor.

Example 8

The procedure of Example 1 was followed except that the THD-32A catalyst was replaced with LYNX 1000 catalyst.

Example 9

The procedure of Example 1 was followed except that the THD-32A catalyst was replaced with LYNX 1000 catalyst and 48 mmols of $H_2$ were added to the reactor.

Example 10

The procedure of Example 1 was followed except that the THD-32A catalyst was replaced with LYNX 1000 catalyst and 80 mmols of $H_2$ were added to the reactor.

Example 11

The procedure of Example 1 was followed except that the THD-32A catalyst was replaced with LYNX 1000 catalyst and DIBDP was replaced with CMDS as the external electron donor.

Example 12

The procedure of Example 1 was followed except that the THD-32A catalyst was replaced with LYNX 1000 catalyst, DIBDP was replaced with CMDS as the external electron donor, and 48 mmols of $H_2$ were added to the reactor.

Example 13

The procedure of Example 1 was followed except that the THD-32A catalyst was replaced with LYNX 1000 catalyst, DIBDP was replaced with CMDS as the external electron donor, and 80 mmols of $H_2$ were added to the reactor.

Example 14

The procedure of Example 1 was followed except that the THD-32A catalyst was replaced with LYNX 1000 catalyst and the Al/donor ratio changed to 50.

Example 15

The procedure of Example 1 was followed except that the THD-32A catalyst was replaced with LYNX 1000 catalyst, the Al/donor ratio changed to 50, and 48 mmols of $H_2$ were added to the reactor.

Example 16

The procedure of Example 1 was followed except that the THD-32A catalyst was replaced with LYNX 1000 catalyst, the Al/donor ratio changed to 50, and 80 mmols of $H_2$ were added to the reactor.

Example 17

The procedure of Example 1 was followed except that the THD-32A catalyst was replaced with LYNX 1000 catalyst, DIBDP was replaced with CMDS as the external electron donor, and the Al/donor ratio changed to 50.

Example 18

The procedure of Example 1 was followed except that the THD-32A catalyst was replaced with LYNX 1000 catalyst, DIBDP was replaced with CMDS as the external electron donor, the Al/donor ratio changed to 50, and 48 mmols of $H_2$ were added to the reactor.

Example 19

The procedure of Example 1 was followed except that the THD-32A catalyst was replaced with LYNX 1000 catalyst, DIBDP was replaced with CMDS as the external electron donor, the Al/donor ratio changed to 50, and 80 mmols of $H_2$ were added to the reactor.

Table 1 below shows the bulk density (BD), the melt flow rate (MFR), the catalyst activity, and the amount of xylene solubles for each of the polymers produced in examples 1–19.

As indicated in Table 1, the polymers produced using DIBDP exhibited higher MFR values than the polymer produced using CMDS. In general, the MFR values produced using the DIBDP catalyst were at least twice the MFR values produced using the CMDS catalyst under the same conditions. This trend indicates that the DIBDP catalyst system produced polymers with shorter chain lengths than did the CMDS system and that the DIBDP catalyst system was more responsive to $H_2$ than the CMDS system. Experience suggests that MFR values obtained in commercial production can be about ten to twenty times the MFR values obtained in laboratory scale experiments. Thus, lab-scale MFR results of about 60 can be expected to yield production MFR results in the range of about 600–1,200 g/10 min. Furthermore, it is expected that commercial process conditions may vary more widely from those in the laboratory scale experiments described herein, and in particular the Al/D ratio may be about equal to or greater than 200. The Al/D ratio can vary from the relatively high donor levels used in the test runs shown in Table 1, to very low donor levels used in commercial process equipment, with Al/D ratios of up to 400 or even 500 possible. It is therefore believed that polymers having ultra-high MFR values can be attained using conventional Ziegler-Natta catalyst in combination with the external electron donor of the present invention.

The polymers produced from the test runs advantageously contained less than 3 weight (wt.) % solubles, with most having less than 2 wt % XS, thus indicating that few atactic fragments formed in the polymers during polymerization. In the examples using the LYNX 1000 catalyst and the DIBDP donor, each of the test runs produced a polymer having XS values less than 2 wt %. Also, the catalyst activity achieved in each of the test runs was relatively high, with the exception of test no. 6. Based on all of these results, using a conventional Ziegler-Natta catalyst in combination with a DIBDP external donor generally improves the properties of the polymers produced therefrom. Various articles of manufacture can be made from the polymers produced using the present invention, including for example, injection and blow molded articles, films, sheets and wrap material.

While the preferred embodiments of the invention have been shown and described, modifications thereof can be

TABLE 1

| Test | Catalyst | Donor | Al/D | $H_2$ (mmol) | BD (g/cc) | Activity (g/g/hr) | MFR (g/10 min.) | XS (wt. %) |
|---|---|---|---|---|---|---|---|---|
| 1 | THC | DIBDP | 10 | 16 | 0.47 | 20300 | 6.84 | 1.60 |
| 2 | THC | DIBDP | 10 | 48 | 0.48 | 32500 | 23.58 | 2.39 |
| 3 | THC | DIBDP | 50 | 16 | 0.44 | 25000 | 9.94 | 1.63 |
| 4 | THC | DIBDP | 50 | 48 | 0.49 | 34500 | 27.33 | 2.22 |
| 5 | THC | CMDS | 10 | 16 | 0.47 | 27600 | 3.00 | 1.04 |
| 6 | THC | CMDS | 10 | 32 | 0.48 | 4800 | 6.40 | 1.55 |
| 7 | THC | CMDS | 10 | 48 | 0.48 | 41200 | 8.80 | 1.48 |
| 8 | LYNX 1000 | DIBDP | 10 | 16 | 0.42 | 17400 | 16.54 | 1.39 |
| 9 | LYNX 1000 | DIBDP | 10 | 48 | 0.43 | 18900 | 42.15 | 0.72 |
| 10 | LYNX 1000 | DIBDP | 10 | 80 | 0.43 | 27600 | 67.46 | 1.23 |
| 11 | LYNX 1000 | CMDS | 10 | 16 | 0.43 | 26200 | 7.47 | 0.76 |
| 12 | LYNX 1000 | CMDS | 10 | 48 | 0.45 | 37900 | 16.69 | 0.93 |
| 13 | LYNX 1000 | CMDS | 10 | 80 | 0.43 | 25300 | 30.29 | 1.98 |
| 14 | LYNX 1000 | DIBDP | 50 | 16 | 0.42 | 21900 | 9.30 | 1.62 |
| 15 | LYNX 1000 | DIBDP | 50 | 48 | 0.42 | 25800 | 35.08 | 1.68 |
| 16 | LYNX 1000 | DIBDP | 50 | 80 | 0.44 | 27500 | 58.38 | 1.71 |
| 17 | LYNX 1000 | CMDS | 50 | 16 | 0.43 | 30300 | 6.72 | 1.51 |
| 18 | LYNX 1000 | CMDS | 50 | 48 | 0.41 | 34700 | 17.00 | 2.07 |
| 19 | LYNX 1000 | CMDS | 50 | 80 | 0.43 | 36700 | 27.88 | 1.64 |

What is claimed is:

1. A catalyst system for the polymerization of olefins, comprising:

a Ziegler-Natta catalyst comprising a transition metal compound generally represented by the formula:

wherein M is a transition metal, R' is independently a halogen or a hydrocarboxyl, and x is the valence of the transition metal; and an external electron donor selected from the group consisting of 1,3-diethers and combinations thereof.

2. The catalyst system of claim 1, wherein the external electron donor is selected from the group consisting of 1,3-diethers generally represented by the formula:

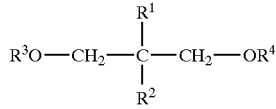

wherein $R^1$ is an alkyl, cycloalkyl, or aryl group, $R^2$ is an alkyl, cycloalkyl, or aryl group, $R^3$ is an alkyl, cycloalkyl, or aryl group, and $R^4$ is an alkyl, cycloalkyl, or aryl group, and wherein any one or more of $R^1$, $R^2$, $R^3$, $R^4$ may be the same or different.

3. The catalyst system of claim 1, wherein the external donor is selected from the group consisting of 2,2-diisobutyl-1,3-dimethoxypropane, 2-isopropyl-2-isopentyl-1,3-dimethoxypropane, 2,2-bis(cyclohexylmethyl)-1,3-dimethoxypropane, and 2,2-bis(cyclohexylmethyl)-1,3-dimethoxypropane.

4. The catalyst system of claim 1, wherein the external electron donor is 2,2-diisobutyl-1,3-dimethoxypropane.

5. The catalyst system of claim 1, wherein M is a group IVB metal and R' is chlorine, bromine, or alkoxy.

6. The catalyst system of claim 1, wherein M is titanium and R' is chlorine or ethoxy.

7. The catalyst system of claim 1 wherein the transition metal compound is selected from the group consisting of $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$, and $Ti(OC_{12}H_{25})Cl_3$.

8. The catalyst system of claim 1, wherein the transition metal compound is $TiCl_4$.

9. The catalyst system of claim 1, further comprising a co-catalyst selected from the group consisting of organoaluminum compounds and combinations thereof.

10. The catalyst system of claim 9, wherein the co-catalyst is selected from the group consisting of trialkylaluminum, alkylaluminum dihalide, trialkoxyaluminum, dialkylaluminum halide, triisobutylaluminum, and combinations thereof.

11. The catalyst system of claim 9, wherein the co-catalyst is triethylaluminum.

12. The catalyst system of claim 1, wherein the Ziegler-Natta catalyst further comprises an internal electron donor.

13. The catalyst system of claim 12, wherein the internal electron donor is selected from the group consisting of an aromatic ester, phthalate, and combinations thereof.

14. A process for polymerizing olefins, comprising:

introducing a catalyst system comprising a Ziegler-Natta catalyst and an external election donor selected from the group consisting of 1,3-diethers and combinations thereof into a reaction zone; and feeding one or more olefin monomers to the reaction zone under conditions suitable for polymerization.

15. The process of claim 14 further comprising: extracting polyolefin polymers.

16. The process of claim 15 wherein the polyolefin is isotactic polypropylene.

17. The process of claim 15 wherein the polyolefin comprises xylene solubles of less than 3 wt %.

18. The process of claim 15 wherein the polyolefin comprises xylene solubles of less than 2 wt %.

19. The process of claim 14 wherein the electron donor comprises 2,2-diisobutyl-1,3-dimethoxypropane.

* * * * *